Patented Feb. 13, 1951

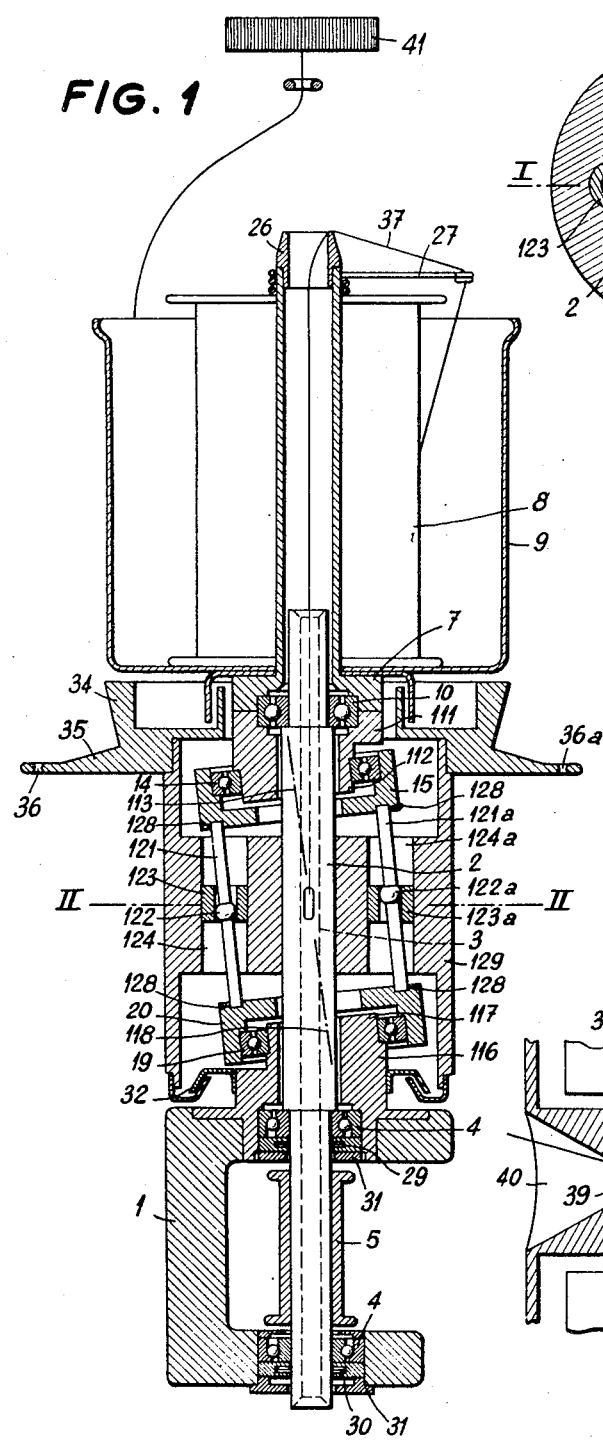

2,541,541

UNITED STATES PATENT OFFICE 2,541,541

TWISTING SPINDLE

Jean-Louis Pellat-Finet and Marcel Riffet, Lyon, France, assignors to R. O. B. E. S. A., Geneva, Switzerland, a firm Application June 1, 1949, Serial No. 96,484
In France June 7, 1948

3 Claims. (Cl. 57—58)

This invention relates to a twisting spindle comprising a hollow central shaft; a support for the supply of the thread; two sleeves concentric with the hollow shaft, and provided with cylindrical shoulders having axes inclined relatively to the axis of the shaft, one of the sleeves being in rigid connection with the support for the thread; two annular members rotatably mounted on the said cylindrical shoulders and connecting members capable of maintaining the two annular members in two parallel planes.

In the spindle according to the invention, the two inclined axes of the cylindrical shoulders are parallel and situated in alignment one with the other, the whole arrangement being such that when one of the sleeves is kept stationary the other one and the thread support are also kept stationary.

The accompanying drawing shows, by way of example, one form of construction according to the invention.

Figure 1 is an axial section of a spindle taken along the line I—I in Figure 2;

Figure 2 is a transverse section taken along the line II—II in Figure 1;

Figure 3 is a longitudinal section taken along the line III—III in Figure 2.

In the drawing, 1 is a stationary frame supporting the spindle; 2 is a shaft provided with a bore 3 and rotatably mounted on said frame by means of two ball-bearings, or thrust bearings 4. A pulley 5 serves to drive rotatably the shaft 2, while a casing 129 is rotatably driven by the shaft 2.

A sleeve or the like 7 supports the supply of the thread which is carried by a spool 8. The thread may be carried by a bobbin or be in the form of a cheese. The sleeve 7 which is supported on the shaft 2 by means of a ball bearing 10, carries a cup-shaped member 9.

The sleeve 7 and consequently also the spool 8 and the cup-shaped member 9 are secured to a sleeve 111, the latter being formed with a cylindrical lower extension or shoulder 112, the geometrical axis 113 of which is inclined relatively to the axis of the shaft 2. A ball bearing 14 is mounted on the sleeve extension 112 and on the outer ring of said bearing is mounted an annular member 15, which can thus turn around the inclined axis 113.

The frame 1 carries a sleeve 116 which is fixed thereto and is formed with an upper cylindrical extension or shoulder 117, the geometrical axis 118 of which is parallel to the axis 113 and in alignment with it. On the sleeve extension 117 is mounted a ball-bearing 19 the outer ring of which carries an annular member 20 which is consequently compelled to turn around the axis 118. The ball-bearings 14 and 19 are coaxial, their common axis being inclined with respect to the axis of the shaft 2.

The members 15 and 20 are operatably connected together by pins 121, 121ᵃ. These pins 121 and 121ᵃ are provided with ball members 122 formed to slide and to swing in bearings 123, 123ᵃ situated in recesses 124, 124ᵃ provided in the casing 129. The extremities of said pins are engaged in recesses 128 provided in the members 15 and 20. The recesses 124, 124ᵃ are so shaped that they allow the pins 121, 121ᵃ angular play within certain limits.

Any number of pins instead of two may be used. The pins may be differently shaped and the ball members 122 as well as the bearings 123 may be replaced by any other equivalent device.

It should be noted that the sleeves 111 and 116 could be formed with inclined extensions connected with the outer rings of the ball-bearings, the members 15 and 20 being then connected with the inner rings of said ball-bearings.

The bobbin holder 7 is provided at its upper part with a ferrule 26; a wire flyer 27 is rotatably mounted on the spindle in order to facilitate the lifting of the thread when the spool 8 is unwound. Packings 29 and 30, held in place by nuts 31, retain the lubricant in the bearings 4.

Lids as the one designated by 32, forming baffles, prevent the lubricant from escaping from the casing 129.

A lid 34 closes the casing 129 at its upper end. This lid 34 presents a flange 35 provided with holes 36, 36ᵃ. The thread 37 coming from the spool 8 enters into the upper end of the spindle after having passed through an eyelet in the wire flyer 27 and leaves the bore 3 in the axis of the shaft 2, by passing through a tubular member 38, an eyelet 39 and an opening 40 in the casing 129. The thread then passes on to a winding-on spool 41 after having been led through a hole 36 provided in the flange 35.

The operation is as follows:

The casing 129 rotating together with the shaft 2 drives the pins 121, 121ᵃ which in their rotation drive the members 15 and 20 around their common axis 113—118. The sleeve 111 cannot rotate around the shaft 2, for any rotation of this sleeve 111 would have the effect of suppressing the coincidence of the axes 113 and 118 since during any rotation of the sleeve 111 around the shaft 2 the axis 113 would describe a cone in the space. The members 15 and 20 connected by the pins 121, 121a oblige the ball-bearings 14 and 19 to remain coaxial, that is to say impose the coincidence of the axes 113 and 118. It follows that the sleeve 111 cannot rotate and that, consequently, the bobbin holder 7 is stationary, as well as the cup-shaped member 9 and the spool 8. Due to the fact that the spool 8 does not rotate, the twisting of the thread becomes double.

The bearings 123, 123a are constructed in such a manner that they do not prevent the slight radial movements of the pins due to the obliquity of the bearings 14 and 19, while guiding the pins suitably.

What we claim is:

1. A twisting spindle comprising a hollow shaft for the inward passage of the thread, means for rotating said shaft, a pair of sleeves arranged concentrically with said hollow shaft in spaced relation with one another, a support for the supply of thread secured to one of said sleeves, each of said sleeves being formed with a cylindrical shoulder having an inclined axis with respect to the axis of the shaft and both axes of said cylindrical shoulders being parallel, an annular member rotatably mounted on each of said inclined cylindrical shoulders and connecting members between said two annular members for constantly holding them in two parallel planes, both inclined axes of said cylindrical shoulders being situated in alignment one with the other, whereby when upon rotation of said hollow shaft one of said sleeves is kept stationary, the other one and the thread support will also be kept stationary.

2. In a twisting spindle comprising a hollow shaft for the inward passage of the thread, means for rotating said shaft, a pair of sleeves arranged concentrically with said hollow shaft in spaced relation with one another, a support for the supply of thread secured to one of said sleeves, each of said sleeves being formed with a cylindrical shoulder having an inclined axis with respect to the axis of the shaft and both axes of said cylindrical shoulders being parallel, an annular member rotatably mounted on each of said inclined cylindrical shoulders, in combination, a set of pins arranged parallel to the inclined axes of the shoulders, connecting said two annular members for constantly holding them in two parallel planes, recesses provided in said annular members intended to receive the extremities of said pins, the inclined axes of said cylindrical shoulders being situated in alignment one with the other, whereby when upon rotation of said hollow shaft one of said sleeves is kept stationary, the other one and the thread support will also be kept stationary.

3. In a twisting spindle comprising a hollow shaft for the inward passage of the thread, means for rotating said shaft, a pair of sleeves arranged concentrically with said hollow shaft in spaced relation with one another, a support for the supply of thread secured to one of said sleeves, each of said sleeves being formed with a cylindrical shoulder having an inclined axis with respect to the axis of the shaft the axes of said cylindrical shoulders being parallel, an annular member rotatably mounted on each of said inclined cylindrical shoulders in combination, a set of pins arranged parallel to the inclined axes of the shoulders, connecting said two annular members for constantly holding them in two parallel planes, recesses provided in said annular members adapted to receive the extremities of said pins, ball members mounted on said pins, a casing turning with said shaft, cylindrical openings in said casing in which said ball members are slidingly mounted, the pins being able to swing around the center of the ball members while sliding in said cylindrical openings, the inclined axes of said cylindrical shoulders being situated in alignment one with the other, whereby when upon rotation of said hollow shaft one of said sleeves is kept stationary, the other one and the thread support will also be kept stationary.

JEAN-LOUIS PELLAT-FINET.
MARCEL RIFFET.

REFERENCES CITED

The following references are of record in the file of this patent:

FOREIGN PATENTS

| Number | Country | Date |
|---|---|---|
| 617,259 | Germany | Aug. 15, 1935 |